United States Patent
Zhang

(10) Patent No.: US 6,468,945 B1
(45) Date of Patent: Oct. 22, 2002

(54) FLUIDS FOR FRACTURING SUBTERRANEAN FORMATIONS

(75) Inventor: Kewei Zhang, Dalhait Hill (CA)

(73) Assignee: BJ Services Company Canada, Calgary (CA)

( * ) Notice: Subject to any disclaimer, the term of this patent is extended or adjusted under 35 U.S.C. 154(b) by 0 days.

(21) Appl. No.: 09/474,164

(22) Filed: Dec. 29, 1999

(30) Foreign Application Priority Data

Dec. 31, 1998 (CA) .............................................. 2257699

(51) Int. Cl.$^7$ ............................. C09K 3/00; E21B 43/16

(52) U.S. Cl. ....................... 507/240; 507/259; 507/203; 507/922; 166/308

(58) Field of Search ................................ 507/240, 259, 507/922, 203; 166/308

(56) References Cited

U.S. PATENT DOCUMENTS

| | | | |
|---|---|---|---|
| 3,361,213 A | | 1/1968 | Savins |
| 3,578,871 A | * | 5/1971 | Abrams ........................ 507/240 |
| 3,937,283 A | | 2/1976 | Blauer et al. |
| 4,007,792 A | * | 2/1977 | Meister ........................ 166/308 |
| 4,061,580 A | | 12/1977 | Jahnke |
| 4,071,457 A | * | 1/1978 | Meister ........................ 166/308 |
| 4,108,782 A | | 8/1978 | Thompson |
| 4,120,356 A | | 10/1978 | Meister |
| 4,148,736 A | | 4/1979 | Meister |
| 4,165,825 A | | 8/1979 | Hansen |
| 4,354,552 A | | 10/1982 | Zingg |
| 4,360,061 A | * | 11/1982 | Canter et al. ................ 507/240 |
| 4,615,825 A | | 10/1986 | Teot et al. |
| RE32,302 E | | 12/1986 | Almond et al. |
| 4,695,389 A | | 9/1987 | Kubala |
| 4,725,372 A | | 2/1988 | Teot et al. |
| 4,735,731 A | | 4/1988 | Rose et al. |
| 4,770,814 A | | 9/1988 | Rose et al. |
| 4,796,702 A | | 1/1989 | Scherubel |
| 4,880,565 A | | 11/1989 | Rose et al. |
| 4,911,241 A | | 3/1990 | Williamson et al. |
| 4,975,482 A | | 12/1990 | Peiffer |
| 5,036,136 A | | 7/1991 | Peiffer |
| 5,093,448 A | | 3/1992 | Peiffer |
| 5,101,903 A | | 4/1992 | Llave et al. |
| 5,161,903 A | | 11/1992 | March |
| 5,246,072 A | * | 9/1993 | Frazier, Jr. ................... 507/255 |
| 5,462,689 A | | 10/1995 | Choy et al. |
| 5,551,516 A | | 9/1996 | Norman et al. |
| 5,566,760 A | | 10/1996 | Harris |
| 5,964,295 A | | 10/1999 | Brown et al. |
| 5,979,555 A | | 11/1999 | Gadberry et al. |
| 5,979,557 A | | 11/1999 | Card et al. |
| 6,035,936 A | | 3/2000 | Whalen |
| 6,106,700 A | | 8/2000 | Collins et al. |
| 6,172,010 B1 | * | 1/2001 | Argillier et al. ............. 507/222 |
| 6,239,183 B1 | | 5/2001 | Farmer et al. |
| 6,258,859 B1 | | 7/2001 | Dahayanake et al. |
| 6,283,212 B1 | | 9/2001 | Hinkel et al. |
| 2002/0023752 A1 | * | 2/2002 | Qu et al. ...................... 507/240 |

FOREIGN PATENT DOCUMENTS

| | | |
|---|---|---|
| CA | 1180176 | 1/1985 |
| CA | 1185779 | 4/1985 |

(List continued on next page.)

OTHER PUBLICATIONS

McLaughlin et al, (1976)—"Aqueous Polymers for Treating Clays in Oil and Gas." Society of Petroleum Engineers 6008.

(List continued on next page.)

*Primary Examiner*—Philip Tucker
(74) *Attorney, Agent, or Firm*—Philip C. Mendes da Costa; Bereskin & Parr

(57) ABSTRACT

A fracturing fluid for use in fracturing subterranean formations surrounding oil and gas wells comprises water, an anionic surfactant, and a cationic surfactant.

15 Claims, 1 Drawing Sheet

FOREIGN PATENT DOCUMENTS

| | | |
|---|---|---|
| CA | 1266600 | 3/1990 |
| CA | 1298697 | 4/1992 |
| CA | 2148583 | 5/1994 |
| CA | 2217659 | 4/1998 |
| CA | 2309460 | 5/1999 |
| EP | 0130647 | 1/1985 |
| EP | 0189042 | 7/1986 |
| EP | 0474284 | 3/1992 |
| GB | 2 354 541 | 3/2001 |

OTHER PUBLICATIONS

Nehmer, (1988)—"Viscoelastic Gravel–Pack Carrier Fluid." Society of Petroleum Engineers 17168.

Stewart et al, (1994)—"Use of a Solids–free Viscous Carrying Fluid in Fracturing Applications: An Economic and Productivity Comparison in Shallow Completions". Society of Petroleum Engineers 30114.

Brown et al, (1996), "Use of Viscoelastic Carrier Fluid in Frac–Pack Applications", Society of Petroleum Engineers 31114.

\* cited by examiner

FLUIDS FOR FRACTURING SUBTERRANEAN FORMATIONS

FIELD OF THE INVENTION

The present invention relates to the field of fluids for fracturing subterranean formations, such as the formations surrounding oil or gas wells, to increase their permeability, and thereby increase the potential flow of recoverable hydrocarbons therefrom.

BACKGROUND OF THE INVENTION

In order to improve the recovery of hydrocarbons from oil and gas wells, the subterranean formations surrounding such wells can be fractured. That is, fluid can be introduced into the formations through the well bores, under high pressure, to open the pores and cracks in the formations. The fluids preferably are loaded with proppants, which are particles of hard material such as sand, to wedge open cracks or pores in the formation, and thereby permanently increase permeability and hydrocarbon flow. Therefore, the fracturing fluids are preferably of high viscosity, and therefore capable of carrying effective volumes of proppant material.

Preferably, the fracturing fluid is susceptible of viscosity drop, so as to be easily removed from the well after fracturing. The fluid should also be fairly non-toxic to the well. That is, it should not leave residue that will form a cake to clog the well, or that will leave undesirable traces in the recoverable hydrocarbons that may be expensive to remove.

Fracturing fluids in common use include aqueous gels and hydrocarbon gels, found by the introduction of cross-linkable polymers into an aqueous or hydrocarbon fluid, followed by the catalyzed cross-linking of the polymers, and the subsequent breaking of the gels, for instance by pH adjustment. These types of systems are quite effective, but require extensive well clean up.

It has been proposed, for instance in U.S. Pat. No. 5,551,516, to provide a fracturing fluid with good viscosity and little residue by combining an inorganic salt stabilizer, a surfactant/thickener and an organic salt or alcohol. The fluid may also contain a gas, and thereby be in the form of a foam. The fluid disclosed in U.S. Pat. No. 5,551,516 develops viscosity of between 150 and 200 cp @ 170 sec$^{-1}$ at temperatures of about 40°–50° C., and surfactant loadings of up to about 5%.

Similar results for viscoelastic surfactant fluids utilizing a single surfactant have been reported by Brown et al in "Use of Viscoelastic Carrier Fluid in Frac-Pack Applications, SPE 31114 (1996) and Stewart et al,"Use of Solids-Free Viscous Carrying Fluid in Fracturing Applications: An Economic and Productivity Comparison in Shallow Completions" SPE 30114 (1994).

The object of the present invention is to provide a fracturing fluid utilizing an anionic surfactant in combination with a cationic surfactant, which at total loadings of up to about 6% surfactant delivers viscosity at 10°–70° C. in the range of 20–500 cp @ 100S$^{-1}$.

The applicant has found that a combination of an anionic surfactant, such as sodium xylene sulfonate, with a cationic surfactant such as N, N, N, trimethyl-1-octadecamnonium chloride will form a viscoelastic gel very quickly, and can be mixed batch-wise in advance, or on-the-fly for use as a fracturing fluid. Inorganic salts may be added as stabilizers, but these are not strictly necessary.

In a broad aspect, then, the present invention relates to a fracturing fluid for use in fracturing subterranean formations surrounding oil and gas wells comprising water, an anionic surfactant, and a cationic surfactant.

BRIEF DESCRIPTION OF THE DRAWINGS

The drawing that illustrates the present invention by way of example.

DETAILED DESCRIPTION

Figure 1:
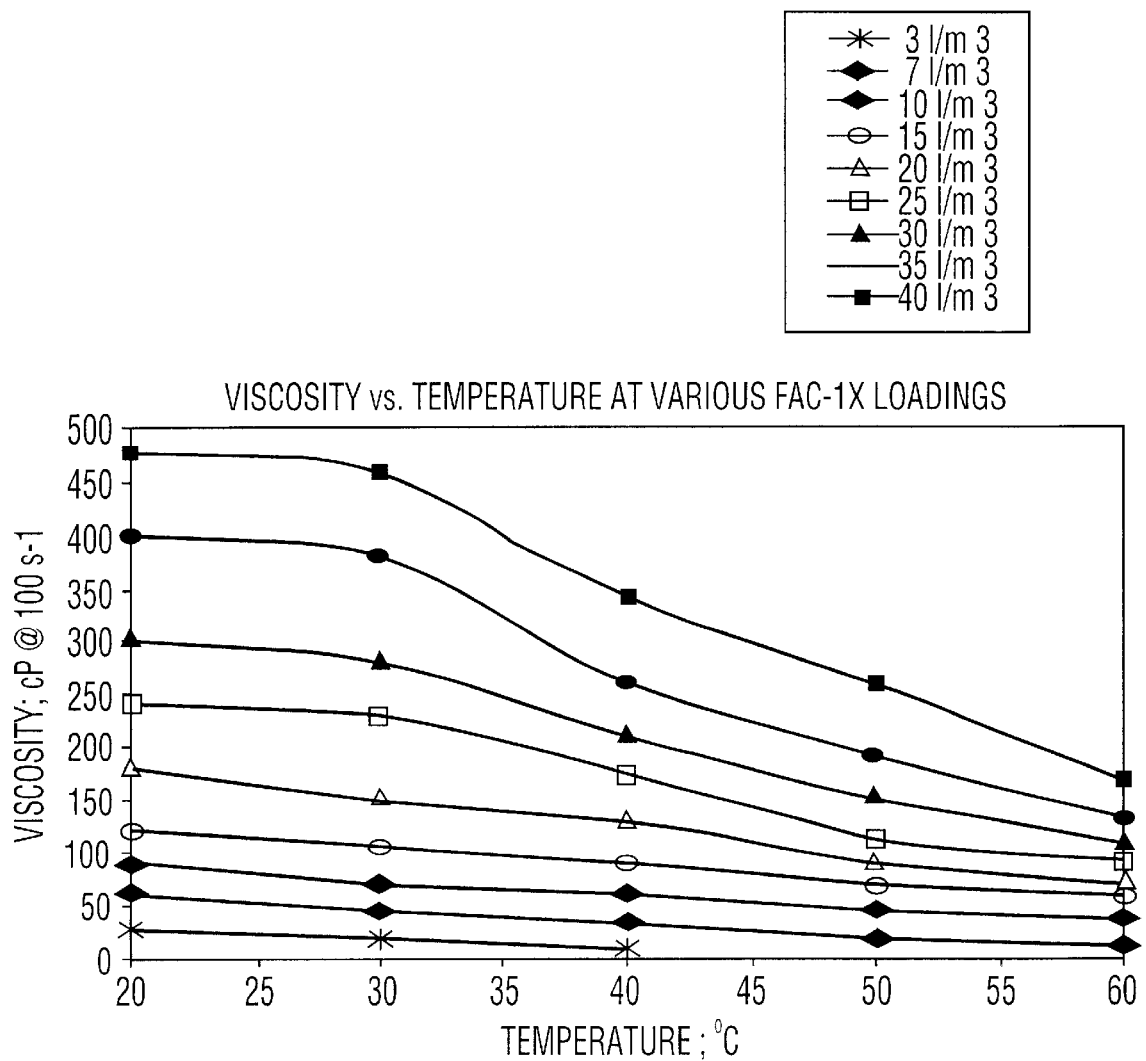
FIG. 1, is a graph of viscosity at combined surfactant concentrations against temperature.

The present invention provides a viscoelastic fracturing fluid capable of achieving high viscosity at a wide range of temperature. An anionic surfactant, such as sodium xylene sulfonate is combined with a cationic surfactant, such as N, N, N, trimethyl-1-octadecamonium chloride, in water, in ratios of from about 1:4 to about 4:1 by volume, to obtain a clear viscoelastic gel capable of proppant transport. The gel of the present invention can be batch-mixed or mixed on-the-fly with good results. The gel of the present in the area of about 30 dynes/cm$^2$, which aids in rapid flow-back for cleaning up the well after fracturing.

Other anionic and/or cationic surfactant may be utilized, as will be obvious to one skilled in the art.

Moreover, the gel of the present invention exhibits good foaming characteristics at loadings of about 3 L/m$^3$ of each of the anionic and cationic surfactant.

The gel of the present invention has a functional temperature range of about 10° C. to 60° C., after which viscosity tends to be too low for effective propane transport.

Referring to FIG. 1, achieved viscosity of the viscoelastic gel of the present invention is illustrated, at given cationic surfactant (FAC-1X) concentrations. Corresponding anionic surfactant (FAC-2X) concentrations are as set out below in Table 1.

| FAC-1X L/m$^3$ | FAC-1X % | FAC-2X L/m$^3$ | FAC-2X % |
| --- | --- | --- | --- |
| 3.0 | 0.3 | 3.0 | 0.3 |
| 7.0 | 0.7 | 5.5 | 0.55 |
| 10.0 | 1.0 | 8.0 | 0.8 |
| 15.0 | 1.5 | 10.0 | 1.0 |
| 20.0 | 2.0 | 13.0 | 1.3 |
| 25.0 | 2.5 | 14.5 | 1.45 |
| 30.0 | 3.0 | 18.0 | 1.8 |
| 35.0 | 3.5 | 20.0 | 2.0 |
| 40.0 | 4.0 | 20.5 | 2.05 |

In each case, the surfactant were mixed with water, and blended together with an overhead blender at low speed. The resulting fluid was placed in a pressured Fann 50 rheometer, where viscosity was measured over a measured range of temperatures.

It will be understood that the data presented in FIG. 1 is exemplary in nature. As can be seen from FIG. 1, however, a wide range of concentrations of anionic and cationic surfactants will result in gels having high viscosities.

I claim:

1. A fracturing fluid for use in fracturing subterranean formations surrounding oil and gas wells consisting of water, an anionic surfactant, a cationic surfactant and a proppant, the ratio of said anionic surfactant to said cationic surfactant is about 1:4 to about 4:1, by volume, and wherein at total loadings of surfactant of up to about 6% by volume, said fluid delivers a viscosity at 10°–70° C. in the range of 20–500 cp @ 100 sec −1.

2. A fluid as claimed in claim 1, wherein said anionic surfactant is sodium xylenesulfonate.

3. A fluid as claimed in claim 1, wherein said cationic surfactant is N, N, N, trimethyl-1-octadecamonium chloride.

4. A fluid as claimed in claim 2, wherein said cationic surfactant is N, N, N, trimethyl-1-octadecamonium chloride.

5. A fluid as claimed in claim 1, wherein said cationic surfactant is added to said water in a quantity of from about 2 L/m$^3$ to about 60 L/m$^3$.

6. A fluid as claimed in claim 1, wherein said anionic surfactant is added to said water in quantities of about 2.0 L/m$^3$ to about 30 L/m$^3$.

7. A viscoelastic fracturing fluid for use in fracturing subterranean formations surrounding oil and gas wells comprising water, an anionic surfactant, a cationic surfactant and a proppant, the ratio of said anionic surfactant to said cationic surfactant is about 1:4 to about 4:1, by volume, and wherein at total loadings of surfactant of up to about 6% by volume, said fluid delivers a viscosity at 10–70° C. in the range of 20–500 cp @ 100 sec −1, said anionic surfactant is sodium xylenesulfonate.

8. A fluid as claimed in claim 7, wherein said cationic surfactant is N, N, N, trimethyl-1-octadecamonium chloride.

9. A fluid as claimed in claim 7 wherein said cationic surfactant is added to said water in a quantity of from about 2 L/m$^3$ to about 60 L/m$^3$.

10. A fluid as claimed in claim 7, wherein said anionic surfactant is added to said water in quantities of about 2.0 L/m$^3$ to about 30 L/m$^3$.

11. A fluid as claimed in claim 7, further including an inorganic salt.

12. A viscoelastic fracturing fluid for use in fracturing subterranean formations surrounding oil and gas wells comprising water, an anionic surfactant, a cationic surfactant and a proppant, the ratio of said anionic surfactant to said cationic surfactant is about 1:4 to about 4:1, by volume, and wherein at total loadings of surfactant of up to about 6% by volume, said fluid delivers a viscosity at 10–70° C. in the range of 20–500 cp @ 100 sec−1, said cationic surfactant is N, N, N, trimethyl-1-octadecamonium chloride.

13. A fluid as claimed in claim 12, wherein said cationic surfactant is added to said water in a quantity of from about 2 L/m$^3$ to about 60 L/m$^3$.

14. A fluid as claimed in claim 12, wherein said anionic surfactant is added to said water in quantities of about 2.0 L/m$^3$ to about 30 L/m$^3$.

15. A fluid as claimed in claim 12, further including an inorganic salt.

* * * * *